Patented Aug. 6, 1940

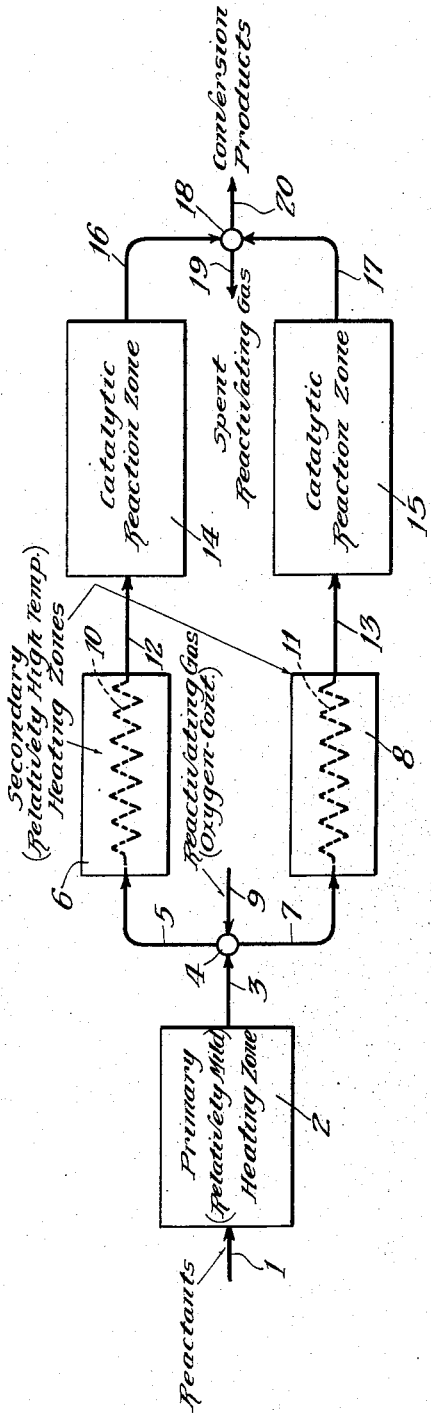

2,210,257

UNITED STATES PATENT OFFICE 2,210,257

CATALYTIC CONVERSION OF HYDRO-
CARBONS

Robert Pyzel and Clarence G. Gerhold, Chicago,
Ill., assignors to Universal Oil Products Company, Chicago, Ill., a corporation of Delaware Application August 12, 1939, Serial No. 289,722

7 Claims. (Cl. 196—52)

This application is a continuation-in-part of our co-pending application Serial No. 245,840, filed December 15, 1938.

The invention relates to an improved process and apparatus for conducting catalytic reactions of the type in which the activity of the catalyst is reduced by the deposition of deleterious materials thereon as the operation progresses and wherein the catalyst is periodically reactivated by contacting the same with a reactivating medium which serves to remove or destroy the deposited deleterious materials without injuring the catalyst.

The features of the invention are applicable to any catalytic reaction of the general type above mentioned, wherein the stream of reactants to be catalytically treated or converted and a stream of the reactivating medium are each separately heated prior to their contact with the catalyst and wherein said catalytic treatment or conversion of the reactants and reactivation of the catalyst are accomplished simultaneously in separate reactors which are alternated with respect to the reactivating and processing steps. In most processes of this general type, catalytic treatment of the reactants is endothermic and reactivation of the catalyst is exothermic, although in some instances both reactions are exothermic. Many of the well known processes for the catalytic conversion of hydrocarbons such as petroleum, petroleum fractions or other mineral oils, hydrocarbon gases and the like, fall within this general class. Catalytic cracking, dehydrogenation, aromatization, cyclization, isomerization and the like are examples of the group in which conversion of the hydrocarbon charging stock is endothermic and reactivation of the catalyst is exothermic. Catalytic polymerization and hydrogenation, on the other hand, exemplify the group in which both reactions are exothermic.

In order to simplify explanation of the invention, the subsequent description, which serves to illustrate the features of the invention and their advantages, is directed to a process of the first mentioned group, above mentioned, and an apparatus in which to conduct the process, wherein the stream of hydrocarbons to be converted is first heated to a temperature at which the desired conversion reaction will occur upon contact of the heated reactants with the catalyst and then passed through one of a plurality of alternately operated reactors, containing the catalytic material and wherein said catalytic conversion is accomplished, while previously used catalyst which has been reduced in activity by the deposition of heavy carbonaceous materials formed during conversion of the reactants is simultaneously reactivated in another reactor of the group by separately heating a stream of oxygen-containing gases and passing the hot oxygen-containing gases in contact with the catalyst.

The inventive features of the process and apparatus herein disclosed reside in the provision of primary and secondary heating zones for accomplishing heating of the stream of hydrocarbon reactants and heating of the stream of reactivating gases prior to their contact with the catalyst, the primary heating zone being continuously employed during the operation for heating the stream of hydrocarbon reactants to a relatively mild temperature and the secondary heating zone comprising separate, alternately operated heating coils through one of which the mildly heated hydrocarbons from the primary heating zone are passed and brought to the desired conversion temperature, while the oxygen-containing reactivating gases, which preferably have also been preheated, but not to the same extent as the hydrocarbons, are simultaneously passed through another of said secondary heating coils, with provision for periodically diverting the flow of reactivating gases to the first mentioned heating coil and diverting the flow of mildly heated hydrocarbons from the primary heating zone to the second mentioned heating coil.

With the arrangement above outlined, no coking difficulties are encountered in the relatively high temperature secondary heating zone, since any small amount of coke or heavy carbonaceous material deposited within each coil, while it is employed to heat the hydrocarbon reactants, is burned therefrom at relatively frequent periodical intervals by passing therethrough the stream of oxygen-containing reactivating gases being supplied to the catalytic reactor in which reactivation is taking place. A further advantage results from the position of the switching valve or valves by means of which the stream of hydrocarbon reactants is periodically diverted from its path of flow through the reactor in which catalytic conversion thereof has been taking place to the reactor containing freshly reactivated catalyst, while the stream of reactivating gases is diverted from its path of flow to the reactor wherein reactivation has been completed to the reactor containing catalyst which requires reactivation. With the system provided by the invention, the switching valve or valves are located in a relatively cool zone along the path of flow of the reactants and reactivating gases. This permits the use of switching valves of less costly construction, designed for lower temperature service and less severe operating conditions in general, as compared with a system in which the switching valves are located in a relatively hot zone immediately ahead of the catalytic reactors, as is conventional practice.

In the accompanying drawing Fig. 1 is a flow diagram illustrating the process flow. Figs. 2 to 5 inclusive diagrammatically illustrate the switching valves 4 and 18 of Fig. 1 and show the respective paths of flow therethrough for the reactants and reactivating gases. Although the drawing shows the apparatus in diagrammatic form, the apparatus features of the invention are believed to reside in the general arrangement of the essential elements of the system, rather than in their specific form and the drawing adequately illustrates this concept of the invention.

Referring to the drawing, the stream of hydrocarbon reactants to be converted is supplied through line 1 to primary heating zone 2 which may be of any desired conventional form capable of heating the reactants to the desired relatively mild temperature. The mildly heated reactants are directed from zone 2 through line 3 to a stream-directing mechanism or switching valve 4 wherethrough it is directed, as desired, either via line 5 to a secondary relatively high temperature heating zone 6 or via line 7 to a substantially identical or similar heating zone 8. The stream-directing mechanism or switching valve serves as a means of periodically alternating the path of flow of the mildly heated reactants with respect to zones 6 and 8 and also alternating the path of flow of a stream of reactivating gases with respect to zones 6 and 8. The reactivating gases which may comprise, for example, combustion gases, steam or other material which does not adversely effect the catalyst employed containing controlled amounts of oxygen (usually in the form of air). The reactivating gas stream is supplied to valve 4 through line 9 and is directed by valve 4 to secondary heating zone 8 when the stream of mildly heated reactants is supplied from zone 2 to zone 6 and after adjusting valve 4, the gas stream is directed to zone 6 while the reactants are supplied to zone 8. The reactivating gases may also be partially heated, prior to their introduction into coil 10 or coil 11, as the case may be, this being accomplished, for example, by compression, heat exchange or in any other well known manner not shown.

The stream-directing mechanism may comprise a conventional manifold arrangement having a plurality of valves of any conventional construction and design capable of functioning under the condition of service to which they are subjected or it may comprise a fourway valve of the reciprocating plunger or rotary plug type, such as illustrated diagrammatically in Figs. 2 and 3. With the valve adjusted as illustrated in Fig. 2, the mildly heated reactants from zone 2 and line 3 are directed through line 5 to secondary heating zone 6, while the reactivating gases from line 9 are directed through line 7 to secondary heating zone 8. With the stream-directing mechanism of valve 4 shifted so that the flow therethrough is as illustrated in Fig. 3, the mildly heated reactants from zone 2 and line 3 are directed through line 7 to secondary heating zone 8, while the reactivating gases from line 9 are directed through line 5 to secondary heating zone 6.

The secondary heating zones 6 and 8 preferably contain similar or substantially identical heating coils or other suitable fluid conduits 10 and 11, respectively. Heating zones 6 and 8 may comprise separate structures independently fired or otherwise independently supplied with the required heat or the fluid conduits 10 and 11 may be so disposed in a single or in separate heating compartments of a furnace structure or the like to receive heat either substantially uniformly or, when required, at different, independently controlled rates. It is also entirely within the scope of the invention to dispose zones 6 and 8 in the same or separate relatively high temperature compartments of the same furnace structure in which zone 2 is disposed.

The streams of reactants and reactivating gases passing through zones 6 and 8, respectively, or zones 8 and 6, respectively, are separately heated to desired temperatures. The temperature at which the reactants are heated is such that the desired conversion thereof will occur upon their subsequent contact with the active catalyst employed and the temperature to which the oxygen-containing reactivating gases are heated is such that combustion of the carbonaceous material deposited on the catalyst, which requires reactivation, will be initiated upon their contact therewith.

Lines 12 and 13 connect fluid conduits 10 and 11, respectively, with the respective catalytic reaction zones 14 and 15 which are alternately operated as zones of catalytic conversion and reactivation, the reactivated catalyst disposed in zone 14 being employed for promoting the desired conversion reaction of the heated reactants from fluid conduit 10 when reactants from zone 2 are supplied to the latter, while any small amount of carbonaceous material deposited in the fluid conduit 11 and on the catalyst disposed in zone 15 is burned therefrom by contact with the stream of hot reactivating gases. Similar carbonaceous material deposited in the fluid conduit 10 and on the catalyst disposed in zone 14 is burned therefrom, while the reactants from zone 2 are heated to the desired higher temperature in fluid conduit 11 and catalytically converted in zone 15. The materials discharged from zones 14 and 15 are directed through the respective lines 16 and 17 to the stream-directing mechanism or switching valve 18, wherefrom the spent reactivating gases are discharged through line 19 preferably to suitable heat recovery, scrubbing and circulating equipment, not illustrated, wherefrom they may be returned together with added air or oxygen to line 9 for further use, while the conversion products are discharged from the stream-directing mechanism or switching valve 18 through line 20, preferably to suitable recovery equipment, not illustrated. However, when desired, heat recovery means employed in either or both streams may be located ahead of the stream-directing mechanism to reduce the temperature at which this mechanism must operate.

The stream-directing mechanism 18 may be the same or of a different type than the stream directing mechanism 4 and, in the particular case here illustrated, they are shown as the same type of mechanism. Figure 4 illustrates the flow through valve 18 when regeneration is taking place in zone 14 and conversion of the reactants is taking place in zone 15. Figure 5 illustrates the flow through valve 18 when reactivation is taking place in zone 15 and conversion of the reactants is taking place in zone 14.

It will be apparent that with the flow and general type and arrangement of apparatus indicated in the drawing, the aforementioned advantageous features of the invention may be applied to any catalytic conversion or treating process of the general type above mentioned.

We claim as our invention:

1. A process of catalytic conversion, which comprises initially heating a stream of reactants to be converted to a relatively mild temperature, thereafter passing the initially heated stream through one of a plurality of fluid conduits and therein heating the same to a substantially higher temperature, at which the desired conversion reaction will occur upon contact of said heated stream with a catalyst capable of promoting said reaction, thereafter passing the highly heated stream through one of a plurality of reaction zones in contact with a mass of said catalytic material and therein effecting said conversion reaction, periodically discontinuing the flow of said stream of initially heated reactants through said fluid conduit and reaction zones and passing the initially heated stream of reactants in series through another of said fluid conduits and another of said reaction zones, wherein said higher heating and the conversion reaction are continued, while simultaneously passing a stream of reactivating material for said catalyst through one of said fluid conduits previously employed for said high temperature heating of the reactants, therein heating the reactivating material to a temperature at which it will effect removal from the catalyst of deleterious materials deposited thereon during the conversion reaction, passing the heated stream of reactivating material through one of said reaction zones previously employed for conducting said conversion reaction, therein contacting the same with a mass of the said catalytic material disposed therein, and effecting the removal therefrom of said deleterious material.

2. A process of catalytic conversion, which comprises initially heating a stream of reactants to be converted to a relatively mild temperature, thereafter passing the initially heated stream through one of a plurality of fluid conduits and therein heating the same to a substantially higher temperature, at which the desired conversion reaction will occur upon contact of said heated stream with a catalyst capable of promoting said reaction, thereafter passing the highly heated stream through one of a plurality of reaction zones in contact with a mass of said catalytic material and therein effecting said conversion reaction, periodically discontinuing the flow of said stream of initially heated reactants through said fluid conduit and reaction zones and passing the initially heated stream of reactants in series through another of said fluid conduits and another of said reaction zones, wherein said higher heating and the conversion reaction are continued, while simultaneously passing a stream of partially heated reactivating material for said catalyst through one of said fluid conduits previously employed for said high temperature heating of the reactants, therein further heating the reactivating material to a temperature at which it will effect removal from the catalyst of deleterious materials deposited thereon during the conversion reaction, passing the heated stream of reactivating material through one of said reaction zones previously employed for conducting said conversion reaction, therein contacting the same with a mass of the said catalytic material disposed therein, and effecting the removal therefrom of said deleterious material.

3. A process for the catalytic conversion of hydrocarbons, which comprises initially heating a stream of hydrocarbons to be converted to a relatively mild temperature, thereafter passing the initially heated stream through one of a plurality of fluid conduits and therein heating the same to a substantially higher temperature at which the desired conversion reaction will occur upon contact of said highly heated stream with a catalyst capable of promoting said reaction, thereafter passing the highly heated stream through one of a plurality of reaction zones in contact with a mass of said catalytic material and therein effecting said conversion reaction, periodically discontinuing the flow of the stream of initially heated hydrocarbons through said fluid conduit and reaction zone and passing the initially heated stream of hydrocarbons in series through another of said fluid conduits and another of said reaction zones, wherein said higher heating and the conversion reaction are continued, while simultaneously passing a stream of oxygen-containing gases through one of said fluid conduits previously employed for said high temperature heating of the hydrocarbons, therein heating the oxygen-containing gases to a temperature at which they will effect combustion of heavy carbonaceous materials deposited on the catalyst during said conversion reaction, passing the heated stream of oxygen-containing gases through one of said reaction zones previously employed for conducting said conversion, therein contacting the same with a mass of the said catalytic material disposed therein, and burning therefrom said deposited carbonaceous material.

4. A process for the catalytic cracking of hydrocarbons, which comprises initially heating a stream of the hydrocarbons to be cracked to a temperature below that at which any appreciable formation and deposition of coke will occur, thereafter passing the initially heated stream through one of a plurality of fluid conduits and therein heating the same to a substantially higher temperature at which said cracking will occur upon contact of the highly heated stream with a catalyst capable of promoting the cracking reaction, thereafter passing the highly heated stream through one of a plurality of reaction zones in contact with a mass of said catalytic material and therein effecting said cracking reaction, periodically discontinuing the flow of said stream of initially heated hydrocarbons through said fluid conduit and reaction zone and passing the initially heated stream in series through another of said fluid conduits and another of said reaction zones, wherein said higher heating and the cracking reaction are continued, while simultaneously passing a stream of oxygen-containing gases through one of said fluid conduits previously employed for said high temperature heating of the hydrocarbons, therein heating the oxygen-containing gases to a temperature at which they will effect combustion of heavy carbonaceous materials deposited on the catalyst during the cracking reaction, passing the heated stream of oxygen-containing gases through one of said reaction zones previously employed for conducting the cracking reaction, therein contacting the same with a mass of the said catalytic material disposed therein, and burning therefrom said deposited carbonaceous material.

5. A process for the catalytic dehydrogenation of hydrocarbons, which comprises initially heating a stream of the hydrocarbons to be dehydrogenated to a temperature below that at which any appreciable formation and deposition of coke will occur, thereafter passing the initially heated stream through one of a plurality of fluid conduits and therein heating the same to a substantially higher temperature at which the desired dehydrogenating reaction will occur upon contact of the highly heated stream with a catalyst capable of promoting said reaction, thereafter passing the highly heated stream through one of a plurality of reaction zones in contact with a mass of said catalytic material and therein effecting said dehydrogenating reaction, periodically discontinuing the flow of the stream of initially heated hydrocarbons through said fluid conduit and the reaction zone and passing the initially heated stream in series through another of said fluid conduits and another of said reaction zones, wherein said higher heating and the dehydrogenating reaction continue, while simultaneously passing a stream of oxygen-containing gases through one of said fluid conduits previously employed for said high temperature heating of the hydrocarbons, therein heating the oxygen-containing gases to a temperature at which they will effect combustion of heavy carbonaceous materials deposited on the catalyst during said dehydrogenating reaction, passing the heated stream of oxygen-containing gases through one of said reaction zones previously employed for conducting said dehydrogenating reaction, therein contacting the same with a mass of the said catalytic material disposed therein and burning therefrom said deposited carbonaceous material.

6. An apparatus of the class described comprising in combination, a primary heater, means for passing a stream of reactants to be catalytically converted through said primary heater and discharging the heated stream of said reactants therefrom, a plurality of separate fluid conduits each disposed in a zone of higher temperature than that of the primary heater, stream-directing means communicating with the discharge end of said primary heater and with the inlet end of each of said separate fluid conduits, an inlet conduit for a stream of reactivating material communicating with said stream-directing means, the stream-directing means being adapted to selectively direct the stream of reactants discharged from said primary heater to any one of said separate fluid conduits and simultaneously direct said stream of reactivating material to another of said separate fluid conduits, a plurality of reactors each containing a mass of catalytic material capable, while in active state, of promoting said conversion reaction and each communicating with a separate fluid conduit of said plurality thereof and discharge conduits from each of said reactors.

7. An apparatus of the class described comprising, in combination, a primary heater, means for passing a stream of reactants to be catalytically converted through said primary heater and discharging the heated stream of said reactants therefrom, a plurality of separate fluid conduits each disposed in a zone of higher temperature than that of the primary heater, stream-directing means communicating with the discharge end of said primary heater and with the inlet end of each of said separate fluid conduits, an inlet conduit for a stream of reactivating material communicating with said stream-directing means, the stream-directing means being adapted to selectively direct the stream of reactants discharged from said primary heater to any one of said separate fluid conduits and simultaneously direct said stream of reactivating material to another of said separate fluid conduits, a plurality of reactors each containing a mass of catalytic material capable, while in active state, of promoting said conversion reaction and each communicating with a separate fluid conduit of said plurality thereof, discharge conduits from each of said reactors communicating with another stream-directing means, a discharge conduit for products of the conversion reaction communicating with the last mentioned stream-directing means, a discharge conduit for spent reactivating material communicating with the last named stream-directing means, said last named stream-directing means being adapted to selectively direct the materials discharged from any one of said reaction zones to either of the last named discharge conduits and direct the materials discharged from any one of the other of said reaction zones to the other of said last named discharge conduit.

ROBERT PYZEL.
CLARENCE G. GERHOLD.